No. 814,560. PATENTED MAR. 6, 1906.
P. W. O'CONNOR.
TIRE.
APPLICATION FILED JUNE 27, 1905.
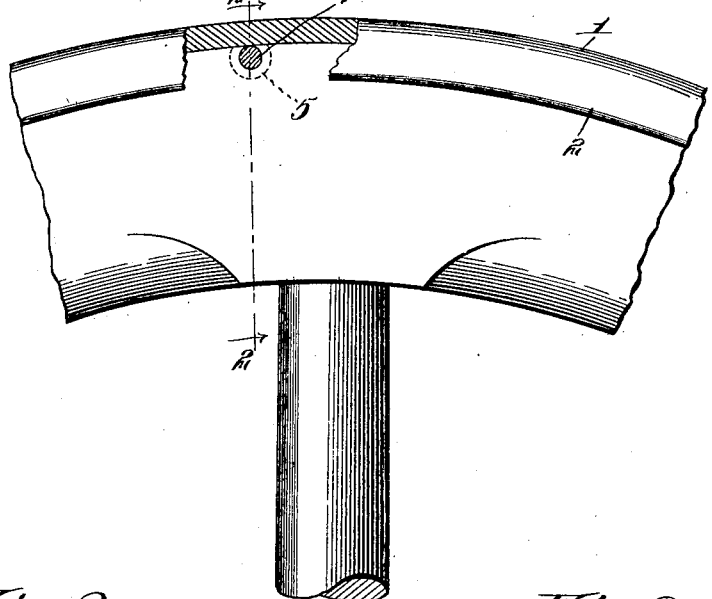
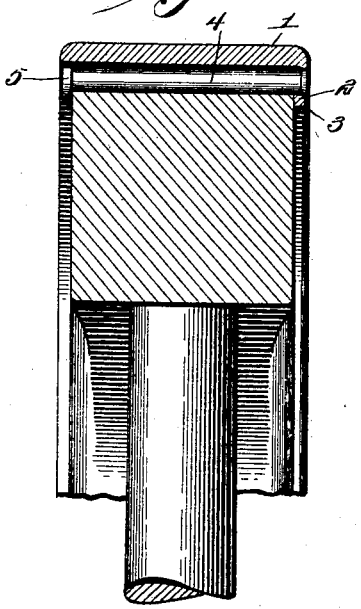
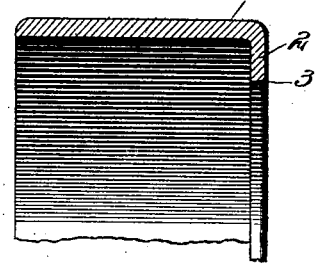
Witnesses
Louis D. Heinrichs
H. H. Byrd
Inventor
Patrick W. O'Connor
By Victor J. Evans
Attorney

UNITED STATES PATENT OFFICE.

PATRICK W. O'CONNOR, OF LINCOLN, NEBRASKA.

TIRE.

No. 814,560.     Specification of Letters Patent.     Patented March 6, 1906.

Application filed June 27, 1905. Serial No. 267,262.

*To all whom it may concern:*

Be it known that I, PATRICK W. O'CONNOR, a citizen of the United States of America, residing at Lincoln, in the county of Lancaster and State of Nebraska, have invented new and useful Improvements in Tires, of which the following is a specification.

My invention relates to a metallic tire and flange for a vehicle-wheel which is secured to the wheel by means of locked rivets passing transversely through the felly close to the tire.

One object of this invention is to provide a novel and highly useful device of this character which can be readily fitted to the wheel, cheap of manufacture, simple in construction, durable, and efficient.

Another object is to provide a tire which is prevented from drooping over the rim by having on one of its sides a flanged portion adapted to receive the rivets that hold it to the felly, thus overcoming the possibility of the felly's splitting, which occurs when the bolts pass through the peripheries of the tire and felly. On wheels of that kind it often happens when the tire works loose that the bolts protrude, and thus have a tendency to break if the vehicle should slip sidewise in turning a corner. With my flanged tire it would be impossible for the rim to be forced over the tire, as the strain would be on the bottom half of the felly, which is always tight to the flange, and is thus protected from being marred by curbstones or other obstructions.

A still further object of my improved flanged tire is one whereby the contraction or expansion of the tire may take place without in any way loosening the rim from the flange. The tire is of uniform thickness and in the making is rolled in one straight piece, the flanged portion being formed by simply turning one of the edges. I claim it to be a decided improvement over all other tires having flanges, in view of the fact that the other flanges are too wide to be bent cold without kinking, and consequently could not be fitted smooth and tight to the rim. The inside of other tires (flange) does not extend over the felly to protect it from being marred by obstructions, ruts, &c.

The invention consists in the construction, combination, and arrangement of parts more fully hereinafter described, claimed, and illustrated in the accompanying drawings, in which—

Figure 1 is a view of the flanged tire as fitted to the felly of a wheel. Fig. 2 is a section taken on the line 2 2, Fig. 1. Fig. 3 is a section of the tire. Fig. 4 is one of the securing-rivets.

Referring to the drawings by reference-numerals, similar numerals designating similar parts in the several figures, 1 is the tire with the flanged portion 2, which extends inwardly and at right angles to the tire 1 and terminates abruptly at 3, said termination being so devised in order to overcome the chipping and curling of the felly's side over that part when the flange terminates by tapering to an edge, as is the case with other flanged tires. The flanged portion 2 is so turned that it will not project beyond the outer edge of the felly 1, thereby conforming to the opposite side of the tire and giving a neat and finished appearance to the whole. The inner periphery of the tire 1 is perfectly smooth and with the inner side of the turned flange 2 forms an exact angle or bearing part for the periphery and side of the felly. Holes can be drilled at intervals throughout its circumference to receive the ends of the securing-rivets, (designated in the drawings by numeral 4,) said rivets being made fast by being riveted to flange. The heads of these securing-rivets have a portion cut away, thus forming a flat surface, as shown in Fig. 4. Said surfaces bind against the inner periphery of the rim, and thereby provide an additional securing means for the rivets. By bringing the ends of the tire 1 over and a little beyond the edges of the felly I secure for the fastening-rivets 4 a concealment and protection, thereby obviating any possibility of their being exposed to the wear of the wheel.

From the foregoing description, taken in connection with the accompanying drawings, the construction of the invention will be understood without a further extended description.

Changes in the form, proportions, and minor details of construction may be made within the scope of the invention without departing from or sacrificing any of the advantages.

Having thus described my invention, what I claim is—

The combination with a wheel-felly, of a tire with one edge flanged and its opposite edge projecting beyond the felly, and a fastening member which passes transversely through the felly and the flange, said member having its head partly cut away to bind against the projecting portion of the tire and serve to prevent loosening of the fastening member.

In testimony whereof I affix my signature in presence of two witnesses.

PATRICK W. O'CONNOR.

Witnesses:
A. J. SAWYER,
NARCISSA SNELL.